US008373925B2

(12) United States Patent
Creeden et al.

(10) Patent No.: US 8,373,925 B2
(45) Date of Patent: Feb. 12, 2013

(54) COMPACT PHOTONIC CRYSTAL FIBER SOURCE

(75) Inventors: Daniel Creeden, Nashua, NH (US); John C. McCarthy, Exeter, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 465 days.

(21) Appl. No.: 12/644,088

(22) Filed: Dec. 22, 2009

(65) Prior Publication Data

US 2011/0149384 A1 Jun. 23, 2011

(51) Int. Cl.
*H01S 3/00* (2006.01)
(52) U.S. Cl. .................................. 359/341.1
(58) Field of Classification Search ............ 359/341.1, 359/341.5, 349
See application file for complete search history.

(56) References Cited

U.S. PATENT DOCUMENTS

| | | | | |
|---|---|---|---|---|
| 6,053,640 | A * | 4/2000 | Miyokawa et al. | 385/88 |
| 6,611,372 | B1 * | 8/2003 | Peyghambarian et al. | 359/341.1 |
| 6,738,186 | B2 * | 5/2004 | Jiang et al. | 359/341.5 |
| 6,836,356 | B2 * | 12/2004 | Jiang et al. | 359/341.5 |
| 7,599,404 | B2 * | 10/2009 | Salin et al. | 372/6 |
| 7,835,068 | B1 * | 11/2010 | Brooks et al. | 359/341.1 |
| 8,073,019 | B2 * | 12/2011 | Liu et al. | 372/6 |
| 2002/0071460 | A1 * | 6/2002 | Goldberg et al. | 372/36 |

OTHER PUBLICATIONS

Di Teodoro, Fabio et al., "Multistage Yb-doped Fiber Amplifier Generating Megawatt Peak-Power, Subnanosecond Pulses", Optics Letters, Dec. 15, 2005, pp. 3299-3301, vol. 30, No. 24.
Schulzgen, A. et al., "Single-Frequency Fiber Oscillator With Watt-Level Output Power Using Photonic Crystal Phosphate Glass Fiber", Optics Express, Aug. 7, 2006, pp. 7087-7092, vol. 14, No. 16.
Brooks, Christopher et al., "1-mJ Energy, 1-MW Peak-Power, 10-W Average-Power, Spectrally Narrow, Diffraction-Limited Pulses From a Photonic-Crystal Fiber Amplifier", Optics Express, Oct. 13, 2005, pp. 8999-9002, vol. 13, No. 22.
Di Teodoro, Fabio et al., "Multi-MW Peak Power, Single Transverse Mode Operation of a 100 Micron Core Diameter, Yb-Doped Photonic Crystal Rod Amplifier", Proc. of SPIE, 2007, 5 pgs., vol. 6453.
Limpert, J. et al., "Extended Single-Mode Photonic Crystal Fiber Lasers", Optics Express, pp. 2715-2720, vol. 14, No. 7.

\* cited by examiner

*Primary Examiner* — Mark Hellner
(74) *Attorney, Agent, or Firm* — Maine Cernota & Rardin; Andrew P. Cernota

(57) ABSTRACT

A system is provided for amplification of laser light, the system having: a plurality of non-silica optical fibers, each the non-silica optical fiber disposed within a sheath; each the non-silica optical fiber being doped with a dopant such that the non-silica fiber has a low non-linear effect; a light source, directing a light beam into a first the non-silica optical fiber; heat dissipating components disposed about the plurality of non-silica optical fibers forming a package; and the package being not greater than 100 cm3.

14 Claims, 1 Drawing Sheet

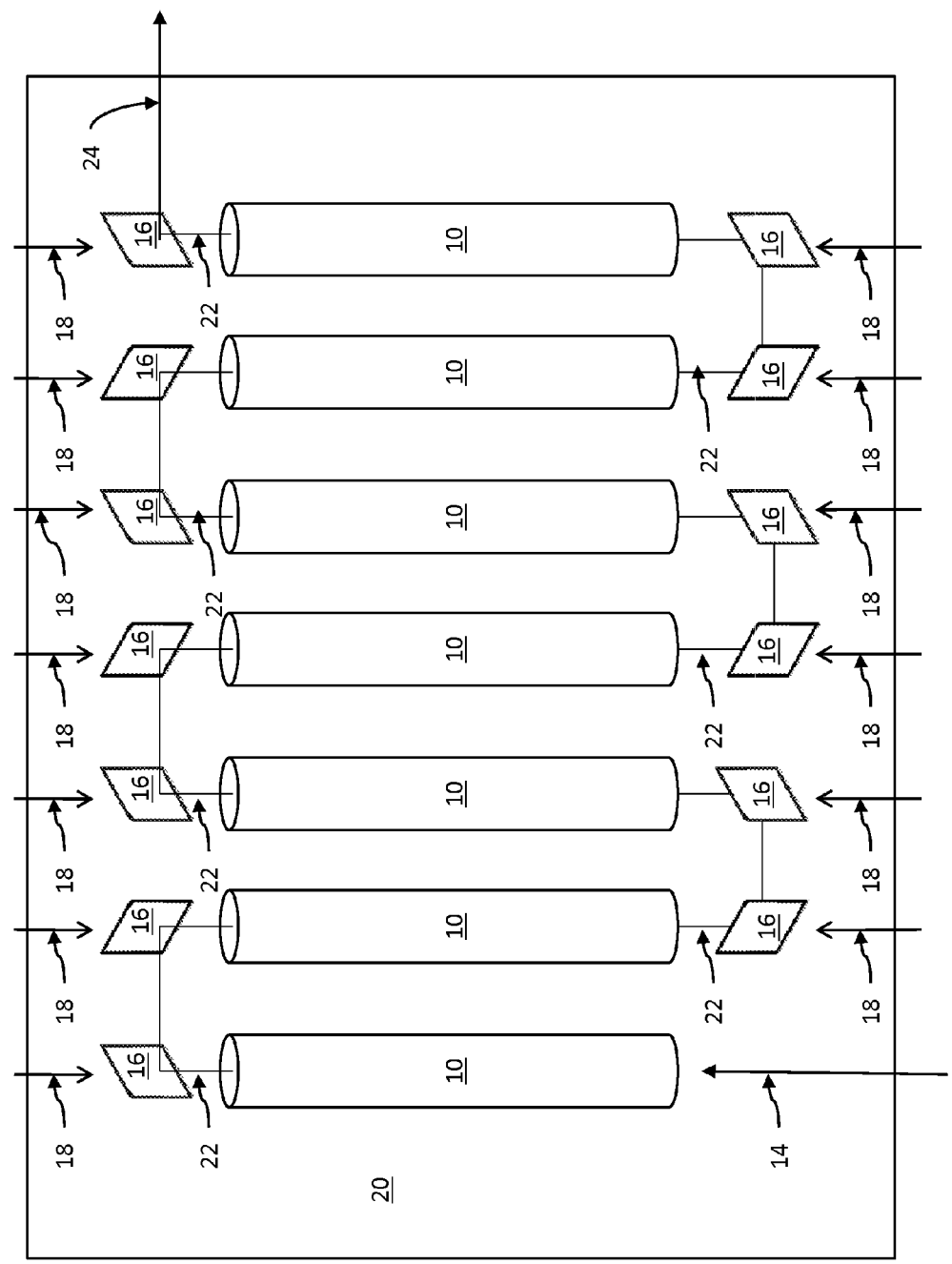

COMPACT PHOTONIC CRYSTAL FIBER SOURCE

FIELD OF THE INVENTION

The invention relates to photonic crystal fibers, and more particularly, to a compact photonic crystal fiber for use with high power/energy laser applications.

BACKGROUND OF THE INVENTION

Photonic crystal fibers allow for high power laser/amplifier operation due to the large core diameters which still offer single-mode output. Such high power laser/amplification operation is due to reduction in the numerical aperture (NA) of the fiber. Reduced numerical aperture (in some embodiments <0.03) of the fibers render those fibers vulnerable to bending losses, and therefore are kept straight. Such fibers, while they can be coiled, must be coiled at large radii, typically over 25 cm. Typical doped fiber lengths configured to allow for efficient pump absorption are on the order of 1 to several meters long. This length, combined with the large coil radius of such fibers renders packaging impossible.

An alternative method employs photonic crystal rods. Photonic crystal rods have a photonic fiber core and a glass jacket that prevents the photonic fiber core from bending. The photonic fiber core typically has a numeric aperture smaller than that of Photonic crystal fibers. It is to accommodate these smaller numeric apertures that the glass shell is utilized. Such rods are typically between 0.5 and 1 m in length, again making compact packaging untenable. In some versions, photonic crystal fibers may comprise a fiber through which pass a plurality of air holes around a solid or hollow core, while in other configurations, photonic crystal fibers comprise a core of a different material than that of the shell.

Lengths for such known systems are typically greater than 0.5 m in length, so compact packaging is simply not possible. Current photonic fiber systems use long fiber lengths, such fiber lengths result in non-linear processes within the optical fiber. These non-linear processes result in decreased output power.

What is needed, therefore, are techniques for providing compact packaging and high non-linear threshold for Photonic crystal fiber systems configured for high power/energy laser applications.

SUMMARY OF THE INVENTION

One embodiment of the present invention provides a system for amplification of laser light, the system comprising: a plurality of non-silica optical fibers, each non-silica optical fiber disposed within a sheath; each the non-silica optical fiber being doped with a dopant such that the non-silica fiber has a low non-linear effect; a light source, directing a light beam into a first non-silica optical fiber; heat dissipating components disposed about the plurality of non-silica optical fibers forming a package; and the package being not greater than 100 cm$^3$.

Another embodiment of the present invention provides such a system wherein each the non-silica optical fiber is not longer than 0.25 m.

A further embodiment of the present invention provides such a system wherein the dopant comprises a dopant selected from the group consisting of rare earth elements and combinations thereof.

Still another embodiment of the present invention provides such a system wherein the dopant comprises a dopant selected from the group consisting of lanthanide elements and combinations thereof.

A still further embodiment of the present invention provides such a system wherein the dopant is selected from the group of lanthanide elements consisting of Ytterbium, Erbium, Holmium, Thulium and combinations thereof.

Even another embodiment of the present invention provides such a system wherein the non-silica optical fiber comprises a phosphate optical fiber.

An even further embodiment of the present invention provides such a system, the system comprising a plurality of the non-silica optical fibers arranged in series.

Yet another embodiment of the present invention provides such a system further comprising dichroic fold mirrors disposed between the non-silica optical fibers.

A yet further embodiment of the present invention provides such a system further comprising at least one light source having a wavelength selected to pump a light beam emitted from the non-silica optical fiber.

Still yet another embodiment of the present invention provides such a system wherein the dopant comprises about approximately 8% by mass of the non-silica fiber.

A still yet further embodiment of the present invention provides such a system wherein the non-silica optical fiber comprises a photonic crystal.

Still even another embodiment of the present invention provides such a system wherein the non-silica fiber is selected from the group of non-silica fibers comprising germanate fibers, germano-silicate fibers, aluminuo-silicate fibers, and combinations thereof.

One embodiment of the present invention provides a compact photonic crystal fiber; the fiber comprising: a non-silica fiber core; a sheath disposed about the non-silica fiber core; a rare earth dopant disposed within the non-silica fiber core; the core being not longer than 0.25 m.

Another embodiment of the present invention provides such a compact photonic crystal fiber wherein the dopant comprises about approximately 8% by mass of the non-silica core.

A further embodiment of the present invention provides such a compact photonic crystal fiber wherein the dopant is selected from the group of lanthanide elements consisting of Ytterbium, Erbium, Holmium, Thulium and combinations thereof.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 1 is a block diagram illustrating a Compact Photonic crystal fiber amplifier chain configured in accordance with one embodiment of the present invention.

DETAILED DESCRIPTION

In one embodiment of the present invention, provides a compact photonic crystal source comprising a photonic core of phosphate fiber provided with high dopant concentrations. As the nonlinear thresholds of photonic crystal fibers are generally dependent on the core size and the fiber length, increased core size and shortened length both allow for increased nonlinear thresholds. Thus Fiber lasers/amplifiers with large cores and short length would provide higher output powers than similar fiber laser/amplifiers of smaller cores or greater fiber length. Photonic crystal fibers allow for greater core diameters while maintaining single-mode operation, something not provided by traditional fibers. To achieve shorter fiber lengths while maintaining single efficient pump absorption, dopant concentration of rare earth elements or lanthanide elements, such as Ytterbium, Erbium, Thulium, or Holmium, must be increased. Increasing such concentration in silica glass, such as that which is typically used, leads to photo darkening a degradation of fiber performance over time. Substitution of phosphate fiber for a silica fiber permits higher doping concentrations, larger core diameter, and a shorter length (under 0.25 m). Such a structure results in very high non-linear thresholds, allowing high peak powers, significantly higher than those of traditional fiber laser amplifiers. Likewise, the shorter rod length afforded by the use of phosphate fiber cores allows for compact packaging without bending of the rod.

As illustrated in FIG. 1 an amplifier may be configured with a plurality of phosphate photonic crystal sources used in series to facilitate increased power operation. In such a configuration, a seed source 12 is provided. In various embodiments a diode, microchip laser, q-switched laser, fiber laser, or other light source 14 is provided, directing light into a short PCF rod 10 configured according to one embodiment of the present invention. A fold mirror 16 is disposed at a distal end of the first short PCF rod 10, directing light 22 emitted by the rod 10 to a second fold mirror to another rod 10. Pump Light 18 may be input added to the amplified light by the fold mirrors 16 and directing the resulting beam through the signal of the original seed input 14, such that the light emitted from the system 24 is amplified. In one embodiment such a wavelength a Ytterbium doped phosphate PCF may be configured to provide a signal wavelength of 1064 nm and a pump wavelength of 940 nm. In one such embodiment, the fold mirrors used may include dichroic fold mirrors or beam splitter. The process is repeated through a plurality of short PCF rods until a desired intensity is achieved. The PCF rods 10 may, in one embodiment of the present invention may be pumped with a light 18 of an appropriate wave length for optical gain at wavelength the amplified signal 24.

In one embodiment, a plurality of small fiber lengths 10 may be used in series, such that in each fiber, a small amount of pump power 18 is used, minimizing heat removal requirements for any one fiber 10. Such a configuration also permits gradual signal gain, thereby reducing the inversion in each single fiber. In such an embodiment, the package containing such a series may be one the order of 10 cm×10 cm×1 cm or smaller, excluding the pump diodes. This is in contrast to known PCF packages which are typically on the order of 50 cm in diameter.

In one embodiment of the present invention, the smaller fibers may be disposed on a heat sink 20 to facilitate the dissipation of heat from the system. In one embodiment, heat sinks 20 may be disposed on both sides of the fibers so as to further facilitate and improve uniformity of such dissipation. Additional heat dissipation may be provided by water cooling the heat sink 20. One skilled in the art will appreciate that other cooling systems may be employed, including but not limited to thermoelectric cooling, air cooling, heat sinks, The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for amplification of laser light, the system comprising:
   a plurality of low gain amplifier in a series, each said low gain amplifier comprising a non-silica optical fiber, said non-silica optical fiber disposed within a sheath and each said low gain amplifier being coupled to its own specific pump source;
   said non-silica optical fiber being doped with a dopant such that said non-silica fiber has a low non-linear effect;
   a light source, directing a light beam into a first said non-silica optical fiber;
   heat dissipating components disposed about said plurality of non-silica optical fibers forming a package; and
   said package being not greater than 100 cm$^3$.

2. The system of claim 1 wherein each said non-silica optical fiber is not longer than 0.25 m.

3. The system of claim 1 wherein said dopant comprises a dopant selected from the group consisting of rare earth elements and combinations thereof.

4. The system of claim 1 wherein said dopant comprises a dopant selected from the group consisting of lanthanide elements and combinations thereof.

5. The system of claim 4 wherein said dopant is selected from the group of lanthanide elements consisting of Ytterbium, Erbium, Holmium, Thulium and combinations thereof.

6. The system according to claim 1 wherein said non-silica optical fiber comprises a phosphate optical fiber.

7. The system according to claim 1 further comprising dichroic fold mirrors disposed between said non-silica optical fibers.

8. The system according to claim 1 further comprising at least one light source having a wavelength selected to pump a light beam emitted from said non-silica optical fiber.

9. The system according to claim 1 wherein said dopant comprises about approximately 8% by mass of the non-silica fiber.

10. The system according to claim 1 wherein said non-silica optical fiber comprises a photonic crystal.

11. The system according to claim 1 wherein said non-silica fiber is selected from the group of non-silica fibers comprising germanate fibers, germano-silicate fibers, aluminuo-silicate fibers, and combinations thereof.

12. The system according to claim 1 wherein said heat dissipating components comprise a heat sink disposed in proximity to said fibers.

13. The system according to claim 12, further comprising a second heat sink disposed opposite to said heat sink disposed in 14. The system according to claim 1 wherein said heat dissipating component is selected from the group of heat dissipating components consisting of: water coolers, thermal electric temperature regulators, and heat sinks and combinations thereof.

\* \* \* \* \*